March 24, 1931. A. W. HALLAM 1,797,261
DUST COLLECTOR
Filed Dec. 23, 1926
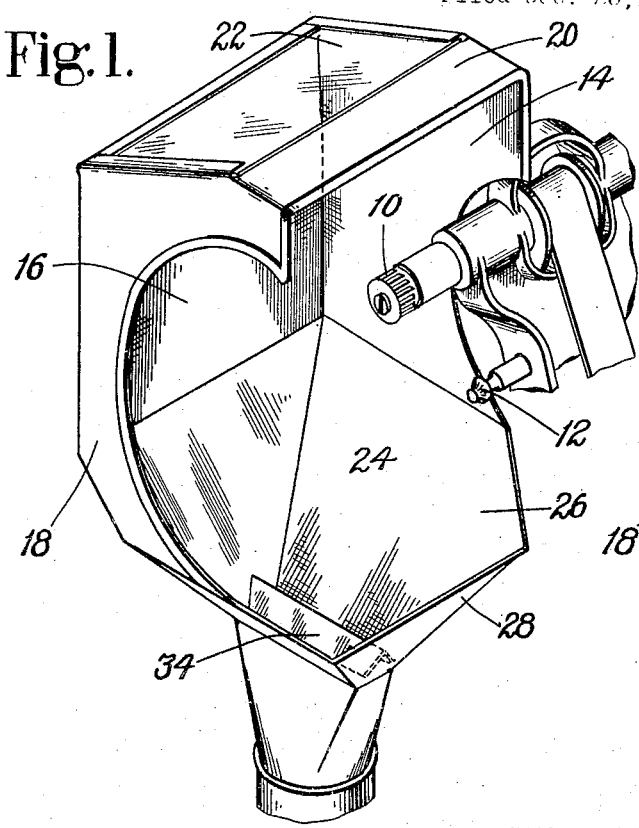
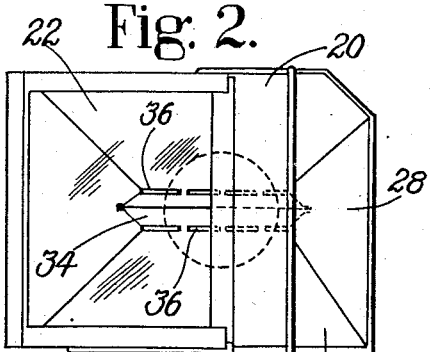
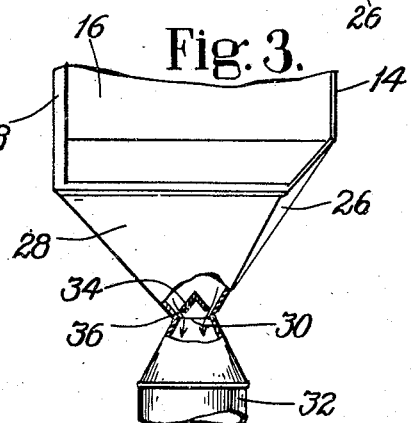
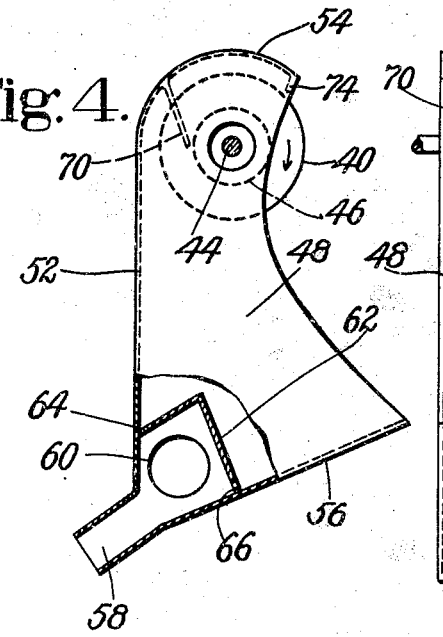
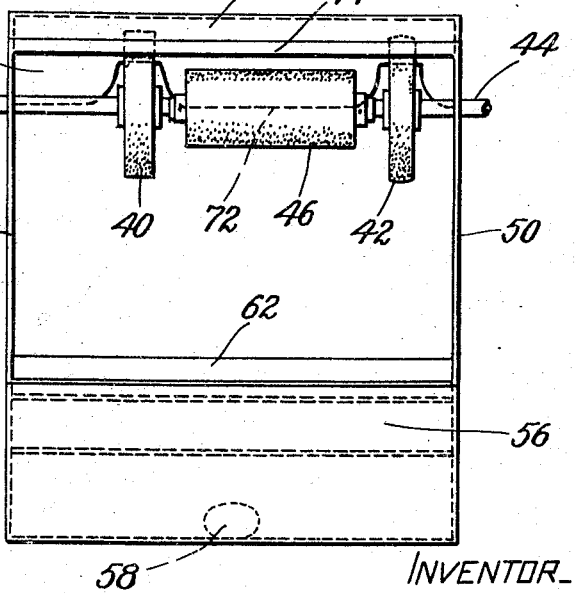
INVENTOR
Albert W. Hallam
By his Attorney,
Nelson N. Howard Patented Mar. 24, 1931

1,797,261

UNITED STATES PATENT OFFICE

ALBERT WILLIAM HALLAM, OF KETTERING, ENGLAND, ASSIGNOR TO UNITED SHOE MACHINERY CORPORATION, OF PATERSON, NEW JERSEY, A CORPORATION OF NEW JERSEY

DUST COLLECTOR

Application filed December 23, 1926, Serial No. 156,607, and in Great Britain December 28, 1925.

This invention relates to dust collectors for abrading and trimming tools such as are employed in boot and shoe finishing machinery. An object of the invention is to increase the efficiency of operation of such dust collectors in removing dust and chips from the atmosphere adjacent to the tools and in collecting the refuse thrown off by the tools.

Dust collectors of the type referred to commonly comprise a hood partially surrounding one or more abraiding or trimming tools to which the work is to be applied and a hopper depending from the hood and provided with sharply inclined walls converging downwardly. The construction and arrangement of the hopper are such that it receives not only material deflected by the hood, but also receives a quantity of material directly from the tool or tools. A suction intake is connected to the outlet opening of the hopper and operates to set up a draft of air which assists in carrying away from the hood and the hopper the chips or other material, herein for convenience termed "dust".

Further to facilitate the removal of dust from the hood and the hopper of a dust collector of the type referred to, in accordance with the above-stated object of the invention, the illustrated dust collector comprises a deflector placed over the outlet opening of the hopper between its downwardly inclined converging walls so as to restrict the area of the outlet opening of the hopper. In accordance with a feature of the invention the deflector is provided with downwardly diverging surfaces which closely approach the hopper walls at a sharp inclination relatively thereto, the deflector surfaces being spaced from the hopper walls to provide a restricted passage having a total area substantially less than the area of the outlet opening to effect a local intensification of the draft and thereby to prevent dust from accumulating upon the walls of the hopper adjacent to the outlet opening. The restricted passage may be so narrow as to assume the form of one or more slits, which serve to intensify the draft through the hopper and direct the draft toward the walls of the hopper, so that the intensified draft operates not only to take away the dust more efficiently from the vicinity of the operating tool, but better to sweep the walls of the dust hood and hopper. Moreover, by reason of the shape and position of the deflector, the accumulation of dust upon the deflector itself is minimized, partly by the action of gravity and partly by the action of the air striking against the deflector as the air is drawn through the narrow slits into the suction intake.

The illustrated deflector plate is ridged or V-shaped, but the invention is not limited to a deflector plate of this particular shape.

In the drawings,

Fig. 1 is a perspective view of one form of dust collector applied to an edge-trimming tool;

Fig. 2 is a plan view thereof;

Fig. 3 is a front elevation, partly in section, of the hopper portion of this form of dust collector;

Fig. 4 is an end elevation, partly in section, showing the invention as applied to a dust collector having a series of abrading tools; and Fig. 5 is a front elevation thereof.

Figs. 1 to 3 illustrate the invention as embodied in a dust collector designed for use with a shoe finishing machine of the type supplied to the repair trade for performing edge trimming operations on boot and shoe soles and comprising forepart and shank edge trimming tools 10 and 12 mounted on the ends of driven shafts. The dust collector illustrated in Figs. 1 to 3 comprises an end wall 14 and a back wall 16, together with a cut-away end wall 18, the several walls being so disposed as not to interfere with the manipulation of a shoe applied to the edge-trimming tools 10 and 12. The upper portion of the illustrated hood is completed by means of a top portion 20 which may, as shown, include a transparent member 22 to provide for the better illumination of the tools. The walls 14, 16 and 18 are connected at their lower edges with a hopper portion 24 comprising sharply inclined side and end walls 26 and 28 converging in the form of an inverted truncated pyramid terminating in a narrow, oblong outlet opening 30 (Fig. 3) which is connected with the suction intake 32 of a suitable apparatus (not shown) arranged to produce a draft through the opening 30. In order to increase the velocity of this draft immediately adjacent to the side walls of the hopper 24, a deflector 34 is soldered or otherwise secured to the hopper walls over the outlet opening 30 and comprises an inverted V-shaped plate the lower edges of which are notched and spaced from the inclined, converging side walls 26 so that the outlet through which the currents of air must pass is reduced to a series of slits 36 (Fig. 2), the total area of the slits 36 being substantially less than the area of the outlet opening 30 by virtue of the fact that the deflector 34 extends partially across the outlet opening 30. It will be noted that each side of the V-shaped plate or deflector 30 is not only sharply inclined to one of the hopper walls, but is also sharply inclined to the line of flow of the air as determined by the hopper walls. Thus there is provided a deflector which is arranged not only to restrict the area of the outlet opening by partially obstructing the passage between the hopper walls, but also to intensify the draft at points immediately adjacent to the side walls of the hopper. Moreover, the accumulation of dust upon this deflector is minimized by reason of its inverted V shape and its position in the hopper, partly as a result of the action of gravity and partly by reason of the action of the air striking against the deflector as it is drawn toward the outlet opening and into the suction intake.

Figs. 4 and 5 illustrate a boot and shoe finishing machine of the type having a series of buffing tools and provided with a dust collector, embodying the present invention, which is especially adapted for use with such a finishing machine. The finishing machine illustrated in Figs. 4 and 5 comprises heel scouring tools 40 and 42 mounted on a driven shaft 44, upon which is also mounted an elongated, cylindrical buffing roll 46 disposed between the other two tools. The dust collector illustrated in Figs. 4 and 5 comprises end walls 48 and 50 jointed to a rear wall 52 which is substantially vertical and terminates at its upper end in a forward, curved portion 54 above the tools. Below the open hood formed by these walls and co-operating therewith is a hopper portion constructed by the addition of a downwardly inclined, forward wall 56 converging toward the rear wall 52 at an angle of 20° to 25° to the horizontal and providing, in connection with the end walls 48 and 50, a hopper-like receptacle for the dust thrown off by the tools, said walls being merged into a suction intake 58. The hood illustrated in Figs. 4 and 5 also has an outlet opening 60 in one of its end walls so that this hood may be connected by means of a horizontal pipe with another hood serving a similar purpose for another series of tools. Like the hood illustrated in Figs. 1 to 3, the hood illustrated in Figs. 4 and 5 is provided with an inverted V-shaped deflecting plate 62, which in construction and operation is similar to the deflector 34, the deflector 62 being mounted in the base of the hopper and having its diverging sides sharply inclined to and terminating at points closely adjacent to the walls 52 and 56, respectively, to form narrow slits 64 and 66, which create an intensified draft operating similarly to the intensified draft created by the slits 36.

There is a tendency for the rotating, abrading tools shown in Figs. 4 and 5, turning, as they do, in the direction of the arrow in Fig. 4, to carry along with them a current of air forming a sort of atmosphere around each of the tools which will be filled with dust. Some of this dust will be thrown off necessarily from time to time by centrifugal force toward the operator unless adequate provision is made to prevent such dust action. In order to avoid this and to interrupt the swirling currents of air, I have provided a notched baffle plate 70 depending from the rear wall 52 at a sharp angle and arranged to approach as closely as is practical to the peripheries of the respective tools 40, 42 and 46 at points where they are moving upwardly, it being observed that the end portions of this baffle plate are arranged to approach quite close to the shaft 44, while the edge 72 of the intermediate portion is brought closely adjacent to the edge of the buffing roll 46. This device will minimize the tendency of the dust to be whirled around by the tools and will tend to deflect such dust as is carried around by the tools downwardly into the hopper of the dust collector. The tendency referred to is further lessened by the provision of another baffle comprising a depending lip 74 at the forward edge of the curved portion 54 of the hood, which lip 74 is brought to a point closely adjacent to the upper edges of the scouring wheels 40 and 42 and, in turn, deflects downwardly particles of dust which have passed beyond the baffle plate 70 and are being carried around by the tools.

What I claim as new and desire to secure by Letters Patent of the United States is:—

1. A dust hood comprising a hopper having downwardly converging sides terminating in an air outlet opening adapted for connection with an exhaust draft system and a deflector adjacent to said outlet opening and having downwardly diverging surfaces which closely approach said sides but are spaced therefrom to provide a restricted passage having a total area substantially less than the area of said outlet opening to effect a local intensification of the draft and thereby to prevent dust from accumulating upon the sides of the hopper adjacent to the outlet opening.

2. A dust hood for a rotary tool comprising a hopper-shaped portion below the tool having steeply inclined, converging sides terminating in an air outlet adapted to be connected to a suction intake, and a ridged deflector plate supported over said outlet, said plate having sharply inclined sides approaching the sides of the hopper-shaped portion and spaced therefrom whereby all the dust-receiving surfaces of the hopper-shaped portion are inclined downwardly at a steep angle to the horizontal so that they offer no lodging places for dust or chips removed by the tool and the draft created by the suction intake will cause the air currents to sweep over said surfaces.

3. A dust hood for a rotary tool comprising a hopper-shaped portion below the tool having steeply inclined converging sides terminating in an air outlet opening adapted to be connected to a suction intake, and an inverted V-shaped deflector plate supported over said outlet opening with its edges spaced from the sides of the hopper-shaped portion to restrict the outlet opening to slits, whereby the velocity of the air passing through the outlet opening is increased and the removal of dust from the sides of the hopper and from the deflector itself facilitated.

In testimony whereof I have signed my name to this specification.

ALBERT WILLIAM HALLAM.